(12) United States Patent
Bhandari et al.

(10) Patent No.: US 10,153,607 B2
(45) Date of Patent: Dec. 11, 2018

(54) PASSIVE Q-SWITCH LASER AND METHOD FOR OPTIMIZING ACTION OF THE SAME

(71) Applicant: SHIMADZU CORPORATION, Nakagyo-Ku, Kyoto-Shi, Kyoto (JP)

(72) Inventors: Rakesh Bhandari, Kyoto (JP); Koji Tojo, Kyoto (JP); Naoya Ishigaki, Kyoto (JP); Shingo Uno, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 15/565,607

(22) PCT Filed: May 12, 2015

(86) PCT No.: PCT/JP2015/063593
§ 371 (c)(1),
(2) Date: Oct. 10, 2017

(87) PCT Pub. No.: WO2016/181488
PCT Pub. Date: Nov. 17, 2016

(65) Prior Publication Data
US 2018/0123310 A1    May 3, 2018

(51) Int. Cl.
*G02F 1/37* (2006.01)
*H01S 3/0941* (2006.01)
(Continued)

(52) U.S. Cl.
CPC ............ *H01S 3/0912* (2013.01); *G02F 1/353* (2013.01); *G02F 1/37* (2013.01); *H01S 3/0092* (2013.01);
(Continued)

(58) Field of Classification Search
CPC .................................................. H01S 3/0912
See application file for complete search history.

(56) References Cited

U.S. PATENT DOCUMENTS

| 5,226,051 A | * | 7/1993 | Chan | ...................... H01S 3/115 372/10 |
| 5,912,912 A | * | 6/1999 | Caprara | ................... H01S 3/07 372/101 |

(Continued)

FOREIGN PATENT DOCUMENTS

| JP | 1997/031411 | 8/1997 |
| JP | A 2003086873 | 3/2003 |

(Continued)

OTHER PUBLICATIONS

PCT/JP2015/063592, International Search Report and Written Opinion dated Jul. 21, 2015, 3 pages—English, 8 pages—Japanese.
(Continued)

*Primary Examiner* — Rhonda S Peace
(74) *Attorney, Agent, or Firm* — Andrew F. Young, Esq.; Lackenbach Siegel, LLP

(57) ABSTRACT

A passive Q-switch laser has an excitation source 1 for outputting excitation light; a laser medium 3 between a pair of reflective mirrors 5a, 5b that constitute part of an optical resonator, the laser medium emitting laser light upon being excited by the excitation light from the excitation source: a saturable absorber 4 disposed between the pair of reflective mirrors, the saturable absorber being configured such that the transmittance thereof increases as the laser light beam the laser medium is absorbed, a matrix table 22 in which the excitation-source output and the optimal value of the pulse width are stored in association with the repetition frequency; and a control unit 21 for referring to the matrix table, reading out the excitation-source output and the optimal value of the pulse width that correspond to an inputted repetition frequency, and controlling the excitation source such that the read-out excitation-source output and optimal value of the pulse width are attained.

5 Claims, 4 Drawing Sheets

(51) Int. Cl.
*H01S 3/16* (2006.01)
*H01S 3/06* (2006.01)
*G02F 1/35* (2006.01)
*H01S 3/00* (2006.01)
*H01S 3/091* (2006.01)
*H01S 3/113* (2006.01)

(52) U.S. Cl.
CPC .......... *H01S 3/0602* (2013.01); *H01S 3/0941* (2013.01); *H01S 3/113* (2013.01); *H01S 3/1603* (2013.01); *G02F 2001/354* (2013.01)

(56) References Cited

U.S. PATENT DOCUMENTS

| | | | |
|---|---|---|---|
| 5,982,790 A | 11/1999 | Grossman et al. | |
| 6,038,240 A * | 3/2000 | Deutsch | H01S 3/11 372/10 |
| 7,664,148 B2 | 1/2010 | Sakai et al. | |
| 7,843,978 B2 | 11/2010 | Souhaite et al. | |
| 2003/0138005 A1 * | 7/2003 | Kan | H01S 3/09415 372/25 |
| 2008/0253407 A1 * | 10/2008 | Hollemann | H01S 3/117 372/13 |
| 2009/0016385 A1 | 1/2009 | Sakai et al. | |
| 2014/0209794 A1 * | 7/2014 | Woodruff | G01J 3/443 250/226 |
| 2018/0123310 A1 * | 5/2018 | Bhandari | H01S 3/0912 |

FOREIGN PATENT DOCUMENTS

| | | |
|---|---|---|
| JP | A2006073962 | 3/2006 |
| JP | 2008-112805 | 5/2008 |
| JP | 2008-117805 | 5/2008 |
| JP | 2008-140820 | 6/2008 |
| WO | WO 1997/031411 | 8/1997 |

OTHER PUBLICATIONS

PCT/JP2015/063593, International Preliminary Report on Patentability, Chapter I dated Nov. 14, 2017, 6 pages—English.

* cited by examiner

FIG. 3

| Repetition Frequency (Hz) | Pump Power (w) | Pump Pulse Width (μs) | SHG Temperature (°C) | THG Temperature (°C) |
|---|---|---|---|---|
| Single Pulse | 42 | 200 | 25.0 | 30.3 |
| 10 – 100 | ---- | ---- | ---- | ---- |
| 101 – 200 | ---- | ---- | ---- | ---- |
| 201 – 300 | ---- | ---- | ---- | ---- |
| 301 – 400 | ---- | ---- | ---- | ---- |
| 401 – 500 | 72 | 80 | 25.0 | 30.5 |
| 501 – 600 | ---- | ---- | ---- | ---- |
| 601 – 700 | ---- | ---- | ---- | ---- |
| 701 – 800 | ---- | ---- | ---- | ---- |
| 801 – 900 | ---- | ---- | ---- | ---- |
| 901 – 1000 | 100 | 55 | 24.8 | 31.0 |

PASSIVE Q-SWITCH LASER AND METHOD FOR OPTIMIZING ACTION OF THE SAME

CROSS REFERENCE TO RELATED APPLICATIONS

This application relates to, and claims priority as § 371 of Ser. No.: PCT/JP2015/064593 filed May 12, 2015, the entire contents of which are incorporated herein by reference.

FIGURE SELECTED FOR PUBLICATION

FIG. 1

BACKGROUND OF THE INVENTION

Field of the Invention

The present invention relates to a passive Q-switch laser applied to a spectroscopy, a laser machining device and a laser lighting device, and an operation optimization method thereof.

Description of the Related Art

FIG. 4 is a diagram illustrating a structure of the conventional passive Q-switch laser (Patent Document 1, 2). Referring to FIG. 4, the passive Q-switch laser comprises an excitation source 1, lenses 2a, 2b, a mirror 5a, a laser medium (gain medium) 3, a saturable absorber 4 and a mirror 5b. An optical resonator comprises the mirror 5a, the laser medium 3, the saturable absorber 4, and the mirror 5b.

The excitation source 1 comprises a laser diode for excitation (pumping) and outputs the excitation light, which is excited by the laser diode and has a wavelength approximately 808 nm, to a lens 2a. The lenses 2a, 2b converge the excitation light from the excitation source 1 and outputs to the laser medium 3.

The laser medium 3 that is in-place between the mirror 5a and the mirror 5b comprises Nd:YAG crystals which is excited by the light having approximately 808 nm wavelength and emits the laser beam having approximately 1064 nm wavelength when transiting from the high-energy state (excited level) to the low-energy state (ground level).

The mirror 5a that transmits the light having the wavelength approximately 808 nm and reflects the light having the wavelength approximately 1064 nm with a high-degree of reflection is mounted to one end of the laser medium 3. The mirror 5b partially transmits light having the wavelength 1064 nm and reflects the rest of the light.

The saturable absorber 4 that is in-place between the mirror 5a and the mirror 5b increases the light transmission in accordance with absorption of the laser beam from the laser medium 3. The saturable absorber 4 becomes transparent when the electron density in the excited level is saturated and the Q-value of the light resonator rapidly increases and laser oscillation takes place and the pulsed light is emitted.

In such case, a quasi-continuous-wave (QCW) using the repetition frequency is used to excite the laser to suppress heat caused by the laser medium 3. At this time, the repetition frequency of the output laser is the same as the excitation-repetition frequency.

When obtaining 355 nm UV-output, the original wave (pump wave) that is an output of the passive Q-switch laser is converted to the second harmonic by the second harmonic generation (SHG) 6. The original wave and the second harmonic is converted to the third harmonic by the third harmonic generation (THG) 7. In addition, a phase matching to convert the wave is carried out by adjusting the angle of the SHG 6 and the SHG 7 relative to the optic axis. Temperatures of the SHG 6 and THG 7 are controlled to adjust finely the phase matching.

In addition, the pulsed repetition frequency (hereafter repetition frequency) that is the same as the output frequency excites the laser diode to obtain the desired output frequency. The excitation power of the laser diode (pump power) is set to the maximum energy level that is ordinarily used and the pulse width is set to a bit longer than the threshold value of oscillation.

When the repetition frequency varies, the method to add an offset to the pump power of the laser diode is disclosed (Patent Document 3). Or the method to control the pump of the laser diode by performing feedback of the part of output to the pump controller is disclosed (Patent Document 4).

RELATED PRIOR ART DOCUMENTS

Patent Document

Patent Document 1: JP Patent Published 2003-86873
Patent Document 2: JP Patent Published 2006-73962
Patent Document 3 U.S. Pat. No. 7,843,978 B2
Patent Document 4: U.S. Pat. No. 5,982,790 A

ASPECTS AND SUMMARY OF THE INVENTION

Objects to be Solved

A range of the repetition frequency of the passive Q-switch laser depends on the frequency when carrying out an alignment of the resonator. When the alignment is carried out at the frequency of, the frequency range of the repetition frequency is fo+f'. Here, f' is determined based on the, pump power, the pulse width of the pump power, an initial transmittance of Cr4+:YAG, a transmittance of the output mirror and so forth.

Alignment of the resonator is carried out by adjusting the output mirror. The output mirror is adjusted by an expert and a user is unable to adjust the output mirror. Therefore, the range of the repetition frequency is limited due to the adjustment of the output mirror, which should be carried out in a factory. For example, a laser diode aligned so as to oscillate at 1 KHz does not oscillate at 50 Hz.

Relative to a use for spectrometry, LIBS (Laser Induced Breakdown Spectroscopy) and so forth, it is desirable that the laser stably oscillates in the range of single pulse to a repetition frequency of KHz.

The present invention provides a passive Q-switch laser and an optimization method of the operation of the same, which stably oscillates the laser in the range of single pulse to the repetition frequency of KHz.

Means for Solving the Problem

For solving the above problems, a passive Q-switch laser according to the aspect of the present invention comprises: an excitation source that is excited at a repetition frequency and outputs an excitation light; a laser medium that is in-place between a pair of reflection mirrors consisting of an optic resonator emits a laser beam excited by the excitation light from the excitation source; a saturable absorber that is in-place between the pair of the mirrors increases a transmittance in accordance with an absorption of the laser beam from the laser medium; a matrix table that stores an optimal value of the output of the excitation source and an optimal value of a pulse width relative to the repetition frequency in coordination with one another; a control element that reads out the optimal value of the output of the excitation source and the optimal value of the pulse width, respectively corresponding to the input repetition frequency, referring to the matrix table and controls the excitation source so as to have the read-out optimal value of the output of the excitation source and the read-out optimal value of the pulse width.

An operation optimizing method of a passive Q-switch laser, wherein the passive Q-switch laser comprises: an excitation source that is excited at a repetition frequency and emits an excitation light; a laser medium that is in-place between a pair of reflection mirrors consisting of an optic resonator emits a laser beam excited by the excitation light from the excitation source; a saturable absorber that is in-place between the pair of the mirrors increases a transmittance in accordance with an absorption of the laser beam from the laser medium;

comprising: steps of generating a matrix table that stores an optimal value of an output of the excitation source and an optimal value of a pulse width relative to the repetition frequency in coordination with one another; controlling a control element that reads out the optimal value of the output of the excitation source and the optimal value of the pulse width, respectively corresponding to the input repetition frequency, referring to the matrix table and controls the excitation source so as to have the read-out optimal value of the output of the excitation source and the read-out optimal value of the pulse width.

Effect of the Invention

According to the aspect of the present invention, a control element that reads out the optimal value of the output of the excitation source and the optimal value of the pulse width, respectively corresponding to the input repetition frequency, referring to the matrix table and controls the excitation source so as to have the optimal value of the read-out output of the excitation source and the optimal value of the pulse width. Therefore, the range of the repetition frequency is expanded and the laser oscillates stably in the range of a single pulse to a repetition frequency of KHz.

The above and other aspects, features and advantages of the present invention will become apparent from the following description read in conjunction with the accompanying drawings, in which like reference numerals designate the same elements.

BRIEF DESCRIPTION OF THE DRAWINGS

FIG. 3 is a block diagram illustrating a detail of the example of the matrix table of a passive Q-switch laser according to the aspect of the Embodiment 1 of the present invention.

DETAILED DESCRIPTION OF THE PREFERRED EMBODIMENTS

Figure 1:
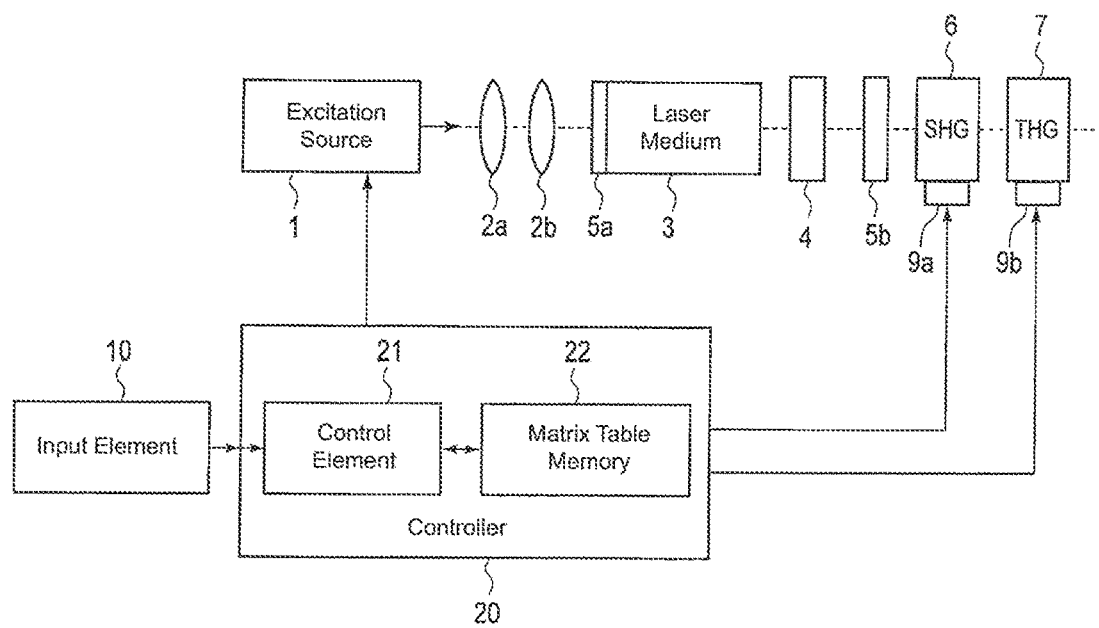
FIG. 1 is a block diagram illustrating a passive Q-switch laser according to the aspect of the Embodiment 1 of the present invention.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

Embodiment 1

Hereinafter, referring to FIGS., the inventor sets forth further detail of a passive Q-switch laser and an optimization method for the operation thereof according to the aspect of the Embodiment of the present invention. First, the inventor sets forth the outline of the present invention.

The optimal condition for the operation of the passive Q-switch laser varies depending on the repetition frequency for the laser excitation. In addition, the optimal operation condition of the wavelength conversion element to obtain a third harmonic varies differently depending the repetition frequency. The optimal operation condition comprises the pump power, the pump pulse width, temperature of the wavelength conversion element to obtain a second harmonic and temperature of the wavelength conversion element to obtain the third harmonic.

Therefore, an inspection of the wavelength conversion is carried out in a factory to determine the optimal operation condition. The matrix table is generated in advance corresponding to the pump power, the pump pulse width, temperature of the wavelength conversion element to obtain the second harmonic and temperature of the wavelength conversion element to obtain the third harmonic based on such optimal operation condition.

Next, the inventor sets forth the passive Q-switch laser and the operation optimization method according to the aspect of the Embodiment 1 using the matrix table. FIG. 1 is the block diagram illustrating the passive Q-switch laser according to the aspect of the Embodiment 1 of the present invention. Referring to FIG. 1, the passive Q-switch laser according to the aspect of the Embodiment 1 comprises an excitation source 1, lenses 2a, 2b, a mirror 5a, a laser medium 3, a saturable absorber 4 and a mirror 5b, a SHG 6, a THG 7, a first temperature adjustment element 9a, a second temperature adjustment element 9b, an input element 10 and a controller 20. An optical resonator comprises the mirror 5a, the laser medium 3, the saturable absorber 4, and the mirror 5b.

Figure 4:
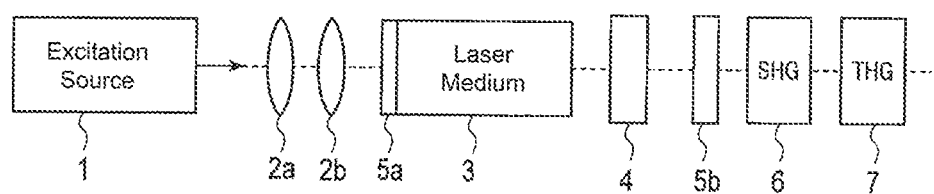
FIG. 4 is a diagram illustrating a structure of the conventional passive Q-switch laser.

In addition, referring to FIG. 1, the inventor skips to set forth the same element as shown in FIG. 4. Here, the inventor sets forth relative to the first temperature adjustment element 9a, the second temperature adjustment element 9b, the input element 10 and the controller 20.

The first temperature adjustment element 9a made of a Peltier element is in-place contacting to the SHG 6 or in the periphery thereof and adjusts temperature of the SHG 6 as a predetermined temperature based on a temperature control signal from the control element 21. The temperature adjustment element 9b made of a Peltier element is in-place contacting to the THG 7 or in the periphery thereof and adjusts temperature of the THG 7 to a predetermined temperature based on a temperature control signal from the control element 21.

The input element 10 comprises a keyboard, a touch panel and so forth and inputs the repetition frequency of the pulse signal, which excites a laser diode included in the excitation source 1. The controller 20 comprises a microcomputer control element 21 and a matrix table memory 22.

Referring to FIG. 3, the matrix table memory 22 comprises a read-and-write memory and stores an optimal value of the pump power of the excitation source 1 relative to the repetition frequency (corresponding to the output of the excitation source 1 of the present invention), an optimal value of the pump pulse width (corresponding to the pulse width of the present invention), and the optimal value of the temperature of SHG 6 and the optimal value of the temperature of THG 7, correspondingly.

Referring to the matrix table 22, the control element 21 reads out the optimal value of the pump power of the excitation source 1 corresponding to the repetition frequency input from the input element 10 and the optimal value of the pump pulse width, and controls the excitation source 1 to provide the respective values that are the same as the read-out optimal value of the pump power and the optimal value of the pulse width.

In addition, referring to the matrix table, the control element 21 reads out the optimal value of temperature of the SHG 6 and the optimal value of temperature of THG 7, respectively corresponding to the repetition frequency, input from the input element 10, and outputs the temperature control signal to control the temperature of the SHG 6 and the temperature of the THG 7 so as to be equal to the optimal value of the temperature of the SHG 6 and the optimal value of the temperature of the THG 7, to the first temperature adjustment element 9a and the second temperature adjustment element 9b.

Figure 2:
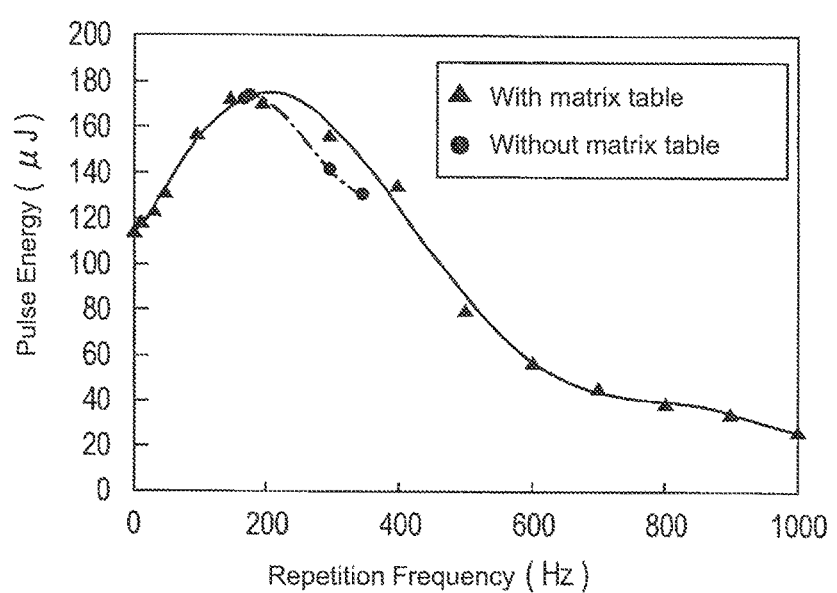
FIG. 2 is a graph illustrating the experimental result showing the relationship between the repetition frequency and the pulse energy with the matrix table of the passive Q-switch laser and without the matrix table.

Next, referring to FIG. 2, the inventor sets forth an operation of the QCW excitation operation relative to the passive Q-switch laser having such structure according to the aspect of the Embodiment 1.

First, the varied repetition frequency is input from the input element 10 when the repetition frequency varies. Subsequently, the control element 21 reads out the optimal value of the pump power of the excitation source 1 corresponding to the repetition frequency from the input element 10 and the optimal value of the pump pulse width referring to the matrix table 22, and controls the excitation source 1 to provide the respective values so as to be the same as the read-out optimal value of the pump power and the optimal value of the pulse width.

For example, referring to the matrix table 22 shown in FIG. 3, when the repetition frequency is in the range of 401 Hz to 500 Hz, the pump power is 72 W, the pump pulse width is 80 µs, so that the control element 21 controls the excitation source 1 to provide the pump power of 72 W and the pump pulse width of 80 µs.

In such way, according to the passive Q-switch laser of the Embodiment, the control element 21 reads out the optimal value of the pump power of the excitation source 1 and the optimal value of the pump pulse width, respectively corresponding to the repetition frequency input, referring to the matrix table 22, and controls the excitation source 1 to provide the respective values that are the same as the read-out optimal value of the pump power and the optimal value of the pulse width. Therefore, the excitation source 1 is always controlled under the optimal operation condition, so that an expansion of the range of the repetition frequency is feasible and the laser is enabled to oscillate stably from a single pulse to a kHz, repetition frequency.

FIG. 2 is a graph illustrating the relationship between the repetition frequency and the pulse energy with the matrix table of the passive Q-switch laser and without the matrix table. Referring to FIG. 2, when the matrix table memory 22 is not used, the repetition frequency is in the range of 170 Hz to 350 Hz.

In contrast, when the matrix table memory 22 is used, stable pulse energies are obtained in the range of the single pulse to the stable pulse energy of 1 kHz, so that it is understandable, referring to FIG. 2, that the range of the repetition frequency is enlarged.

In addition, referring to the matrix table 22, the control element 21 reads out the optimal value of temperature of the SHG 6 and the optimal value of temperature of THG 7 corresponding to the repetition frequency input from the input element 10, and outputs the temperature control signal to control the temperature of the SHG 6 and the temperature of the THG 7 so as to be equal to the optimal value of the temperature of the SHG 6 and the optimal value of the temperature of the THG 7, to the first temperature adjustment element 9a and the second temperature adjustment element 9b. Accordingly, the first temperature adjustment element 9a and the second temperature adjustment element 9b are controlled always under the optimal operation condition, so that the wavelength is converted under the optimal operation condition.

INDUSTRIAL APPLICABILITY

The present invention is applicable to a passive Q-switch laser of a spectroscopic instrument, a laser machining device, a medical device, a laser illumination device and so forth.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A passive Q-switch laser, comprising:
   an excitation source that is excited at a repetition frequency and outputs an excitation light;
   a laser medium that is in-place between a pair of reflection mirrors consisting of an optic resonator that emits a laser beam excited by the excitation light from the excitation source;

a saturable absorber that is in-place between said pair of the mirrors increases a transmittance in accordance with an absorption of the laser beam from said laser medium;

a matrix table that stores an output of said excitation source relative to said repetition frequency in coordination with an optimal value of a pulse width;

a control element that reads out the optimal value of the output of said excitation source and the optimal value of the pulse width, respectively corresponding to the input repetition frequency, referring to said matrix table and controls said excitation source to provide the respective values that are the same as the optimal value of the read-out output of said excitation source and the optimal value of the pulse width;

a first wavelength conversion element that converts a fundamental wave, which is a laser beam from said saturable absorber, to a second harmonic; and a second wavelength conversion element that converts the second harmonic from said first wavelength conversion element and the rest of the fundamental wave to a third harmonic;

wherein:

said matrix table stores correspondingly an optimal value of a temperature of said first wavelength conversion element and an optimal value of temperature of said second wavelength conversion element, which are corresponding to said repetition frequency; said control element, referring to said matrix table, reads out an optimal value of temperature of said first wavelength conversion element and an optimal value of temperature of said second wavelength conversion element, which are corresponding to said input-repetition frequency; and which controls the temperature of said first wavelength conversion element and the temperature of said second wavelength conversion element to be respectively equal to a read-out optimal value of the temperature of said first wavelength conversion element and a read-out optimal value of said second wavelength conversion element.

2. The passive Q-switch laser, according to claim 1, further comprising:

a temperature adjustment element that is installed to said first wavelength conversion element and said second wavelength conversion element respectively; and wherein, said control element outputs a temperature control signal that controls said temperature adjustment element.

3. The passive Q-switch laser, according to claim 1, wherein:

said laser medium comprises a rare-earth dope YAG.

4. The passive Q-switch laser, according to claim 1, wherein:

said saturable absorber comprises Cr:YAG.

5. An operation optimization method of a passive Q-switch laser, which comprises an excitation source that is excited at a repetition frequency and outputs an excitation light; a laser medium that is in-place between a pair of reflection mirrors consisting of a optic resonator outputs a laser beam excited by an excitation light from said excitation source; and a saturable absorber that is in-place between said pair of the mirrors increases a transmittance in accordance with an absorption of the laser beam from said laser medium; the method comprising steps of:

generating a matrix table that stores an optimal value of the output of said excitation source and an optimal value of the pulse width relative to said repetition frequency in coordination with one another; and controlling said control element that reads out the optimal value of the output of said excitation source and the optimal value of the pulse width, respectively corresponding to the input repetition frequency, and that refers to said matrix table and controls the excitation source so as to have a read-out optimal value of the output of said excitation source and a read-out optimal value of the pulse width; and wherein said passive Q-switch laser further comprises:

a first wavelength conversion element that converts a fundamental wave, which is a laser beam from said saturable absorber, to a second harmonic; and a second wavelength conversion element that converts the second harmonic from said first wavelength conversion element and the rest of the fundamental wave to a third harmonic;

wherein said matrix table stores correspondingly an optimal value of a temperature of said first wavelength conversion element and an optimal value of temperature of said second wavelength conversion element, which are corresponding to said repetition frequency; said control element, referring to said matrix table, reads out an optimal value of temperature of said first wavelength conversion element and an optimal value of temperature of said second wavelength conversion element, which are corresponding to said input-repetition frequency; and which controls the temperature of said first wavelength conversion element and the temperature of said second wavelength conversion element to be respectively equal to a read-out optimal value of the temperature of said first wavelength conversion element and a read-out optimal value of said second wavelength conversion element.

* * * * *